US008886670B2

(12) United States Patent
Bajekal et al.

(10) Patent No.: US 8,886,670 B2
(45) Date of Patent: Nov. 11, 2014

(54) SECURELY ACCESSING REMOTE SYSTEMS

(75) Inventors: Sadanand Rajaram Bajekal, Austin, TX (US); Luis B. Casco-Arias, Austin, TX (US); Archit Suhas Lohokare, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/294,942

(22) Filed: Nov. 11, 2011

(65) Prior Publication Data

US 2013/0124566 A1     May 16, 2013

(51) Int. Cl.
*G06F 17/30*     (2006.01)
*G06F 21/41*     (2013.01)

(52) U.S. Cl.
CPC ............................. *G06F 21/41* (2013.01)
USPC ........... 707/781; 707/782; 707/783; 707/784; 707/786; 707/787

(58) Field of Classification Search
USPC .................................................. 707/781–788
See application file for complete search history.

(56) References Cited

U.S. PATENT DOCUMENTS

| | | | |
|---|---|---|---|
| 5,793,952 A | 8/1998 | Limsico | |
| 7,210,167 B2 | 4/2007 | Brezak et al. | |
| 7,562,226 B2 | 7/2009 | Aiken et al. | |
| 8,079,066 B1 * | 12/2011 | Cordell et al. | 726/5 |
| 2002/0184535 A1 | 12/2002 | Moaven et al. | |
| 2003/0046587 A1 | 3/2003 | Bheemarasetti et al. | |
| 2005/0044378 A1 | 2/2005 | Beard et al. | |
| 2006/0265598 A1 | 11/2006 | Plaquin et al. | |
| 2007/0006291 A1 | 1/2007 | Barari et al. | |
| 2007/0167161 A1 * | 7/2007 | Cheng et al. | 455/435.1 |
| 2007/0186106 A1 | 8/2007 | Ting et al. | |
| 2007/0220270 A1 * | 9/2007 | Murakami | 713/183 |
| 2008/0114986 A1 | 5/2008 | Morris et al. | |
| 2008/0175443 A1 | 7/2008 | Kahn et al. | |
| 2009/0094682 A1 | 4/2009 | Sage et al. | |
| 2009/0183008 A1 | 7/2009 | Jobmann | |
| 2010/0306533 A1 | 12/2010 | Phatak | |
| 2011/0093913 A1 | 4/2011 | Wohlert et al. | |
| 2011/0154486 A1 | 6/2011 | Fusari et al. | |
| 2012/0252365 A1 * | 10/2012 | Lam | 455/41.2 |

OTHER PUBLICATIONS

Anonymous; Method and System for Credential Classification and Reuse within IT Systems; IP.com No. IPCOM000206811D; May 9, 2011, pp. 1-4.
Metke, A. et al (Nov. 2009). Smart Grid Security: Technology and Services. Motorola Marketing Communications, pp. 1-10.
Liu L. et al.(Dec. 2009). A two layered trust model selection based on automated trust negotiation for grid service. IEEE 2009 WRI World Congress on Software Engineering, WCSE 2009, pp. 35704/- (89-94).
Ahsant, M. et al.(Jan. 2006). Toward an on-demand restricted delegation mechanism for Grids. Proceedings of the 7th IEEEIACM International Conference on Grid Computing, GRID 2006, IEEE 06EX 1363C (152-159).

* cited by examiner

*Primary Examiner* — Baoquoc N To
(74) *Attorney, Agent, or Firm* — Steven L. Nichols; Van Cott, Bagley, Cornwall & McCarthy P.C.

(57) ABSTRACT

A method for securely accessing a number of computing systems within a remote facility includes, with a mobile computing system, checking out access data from a centralized database, the access data providing access to the computing systems within the remote facility. The mobile computing device then interfaces with a first computing system, the first computing system being unable to have access criteria changed from a remote location. The mobile computing system then provides a user with access to the first computing system using the checked out access data without revealing that checked out access data to the user.

25 Claims, 4 Drawing Sheets

SECURELY ACCESSING REMOTE SYSTEMS

BACKGROUND

Aspects of the present invention relate in general to remote system security, and more particularly, to secure methods for allowing access to remote facilities. Many organizations and entities operate remote facilities. These remote facilities may operate or monitor various types of equipment. For example, utility companies often operate substations at remote locations. The computing systems within these remote locations may be provided with connection to a network such as the Internet.

In some cases, for security purposes, certain computing systems within a substation may not be connected to the network. Access to such computing systems may be allowed upon correct entry of an appropriate password. Entities that operate such remote facilities often contract out maintenance work to be done on such facilities. In order to allow a contractor to perform the appropriate maintenance work, he or she has to be provided with the proper password and any other access criteria. Because some computing systems are not connected to the network, the password cannot be changed remotely. The password is often shared amongst several persons who wish to use the system. This defeats the purpose of having a password to protect sensitive cyber assets. Thus, providing access data to contractors can be considered a security risk according to a variety of security standards.

BRIEF SUMMARY

A method for securely accessing a number of computing systems within a remote facility includes, with a mobile computing system, checking out access data from a centralized database, the access data providing access to the number of computing systems within the remote facility, with the mobile computing system, interfacing with a first computing system of the number of computing systems, the first computing system being unable to have access criteria changed from a remote location, and with the mobile computing system providing a user with access to the first computing system using the checked out access data without revealing the checked out access data to the user.

A mobile computing system includes a processor and a memory communicatively coupled to the processor. The processor is configured to check out access data from a centralized database, the access data providing access to a number of computing systems within a remote facility, interface with a first computing system of the number of computing systems, the first computing systems being unable to have access criteria changed from a remote location, and provide a user with access to the first computing system using the checked out access data without revealing the access data to the user.

A computer program product for allowing secure access to a remote facility includes a computer readable storage medium having computer readable code embodied therewith. The computer readable code includes computer readable program code configured to check out access data from a remote location, the access data providing access to a number of computing systems within a remote facility, computer readable program code configured to interface with a first computing system of the number of computing systems, the first computing systems being unable to have access criteria changed from a remote location, and computer readable program code configured to provide a user with access to the first computing system using the checked out access data without revealing the access data to the user.

A method for securely accessing remote systems includes, with a mobile computing system, checking out access data from a remote location, the access data providing access to a number of computing systems within a remote facility, with the mobile computing system, interfacing with one of the computing systems, with the mobile computing system, providing access for a user to the one of the computing systems using the checked out access data without revealing the checked out access data to the user if the one of the computing systems is unable to have access criteria changed from a remote location, and with the mobile computing system, providing the user with the checked out access data to the one of the computing systems if the one of the computing systems can have its access criteria changed from a remote location.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
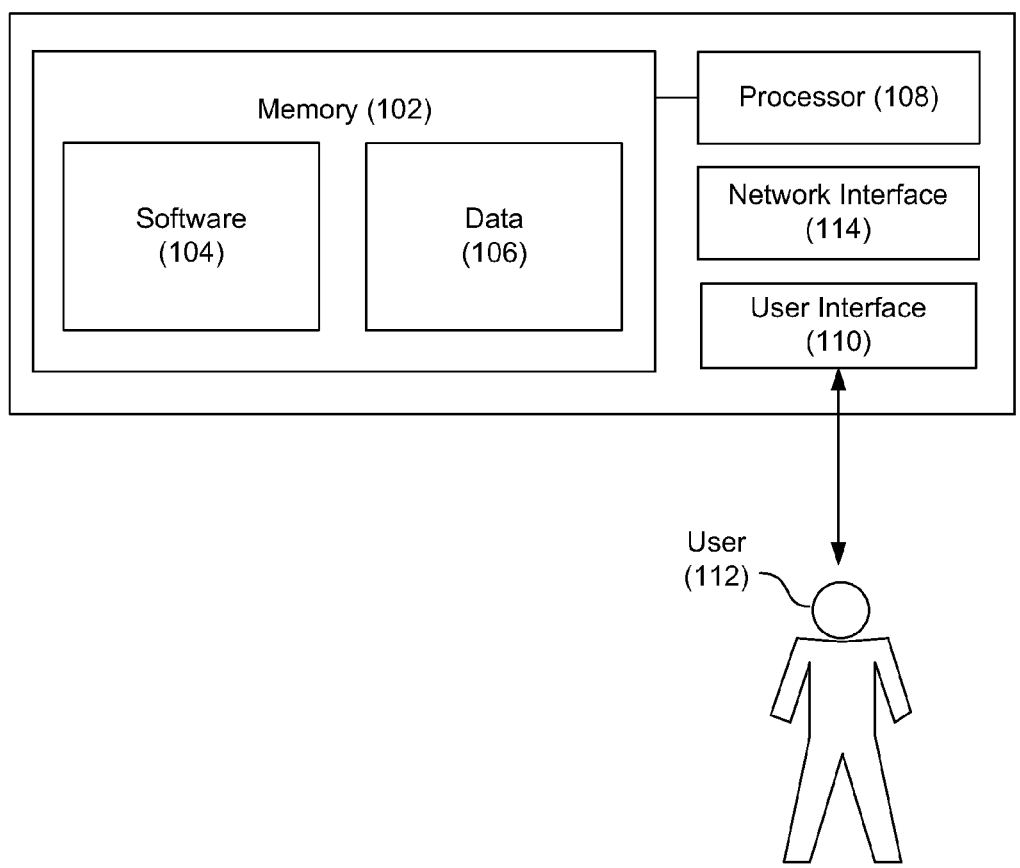
FIG. 1 is a diagram showing an illustrative physical computing system, according to one example of principles described herein.

As mentioned above, providing access data to a contractor on a permanent basis may be perceived as a security risk. If a computing system within a remote facility is connected to a network, then the access data used for entry into that computing system can be changed remotely. However, if a computing system within the remote facility is not connected to the network, then the access data used for entry into that computing system cannot be changed from a remote location. Thus, providing a contractor with the access data for the substation equipment may represent a security risk if the access data cannot be changed easily or frequently.

The present specification discloses methods and systems for allowing a user to securely access computing systems within a remote facility. According to certain illustrative examples, a user is provided with a mobile computing system such as a laptop computer. This laptop computer may have a specific application installed thereon that is used for accessing the computing systems within the remote facility. This application will be referred to as a remote secure access application.

Upon entering the remote facility, the user can use his or her mobile computing system to obtain access data for the computing systems within the remote facility. The access data can be obtained from a trusted repository associated with a centralized database. This process is referred to as "checking out" the access data. The mobile computing system can access the centralized database through a variety of means such as a wireless or mobile network connection.

The manner in which the user is provided access to a particular computing system within the remote facility will depend upon the nature of that particular computing system. Specifically, if a particular computing system within the remote facility is not able to have its access criteria changed remotely, then the access data for that computing system which has been checked out from the trusted repository will not be provided to the user. Rather, the mobile computing system can interface with the computing system which cannot have its access criteria changed remotely and use the checked out access data to provide the user with access. The user never actually sees the access data. Upon completing work at the remote facility, the user will "check in" the access data. Thus, the user will not be able to gain access to that computing system again at a later time without getting authorization from the operator of the remote facility.

If a particular computing system within the remote facility can have its access criteria changed from a remote location and does not maintain its own repository of users, then the mobile computing system can provide the checked out access data for that computing system to the user. For example, the user may be provided with a username and password that is either unique to that user or unique to that particular computing system. When the user completes his or her work at the remote facility, the access criteria for that system can be changed remotely. Thus, it does not matter that the user was provided with the access data because it can be changed remotely. Thus, the user will not be able to again gain access to that system without authorization from the operator of a remote facility. Furthermore the user is not provided with the particulars of how access data is checked out from the trusted repository.

Through use of methods and systems embodying principles described herein, users may be provided access to computing systems within a remote facility without compromising defined security standards. Such users are provided access to computing systems with access criteria that is unable to be changed from a remote location. This access is provided without the user ever being aware of the access data used to access those computing systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Throughout this specification and in the appended claims, the term "access data" is to be broadly interpreted as data that is provided to a computing system from a human user or another computing system for the purpose of accessing that computing system. Access data may include, for example, a username and password.

Throughout this specification and in the appended claims, the term "access criteria" refers to the specific access data that is required to access a particular computing system. For example, the access criteria for a particular computing system may be a set of specific username and password combinations that is used to access that computing system.

Referring now to the figures, FIG. 1 is a diagram showing an illustrative physical computing system (100) that may be used to allow access to computing systems within a remote facility. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory," The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system. Such other applications may include those which manage access data for computing systems stored within remote facilities.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

A network interface (114) allows the computing system to interface with other computing systems through a network. The network interface (114) may be a hardwired interface that connects to a network through physical cables. In some cases, the network interface (114) may interface with a network over a wireless connection.

Figure 2:
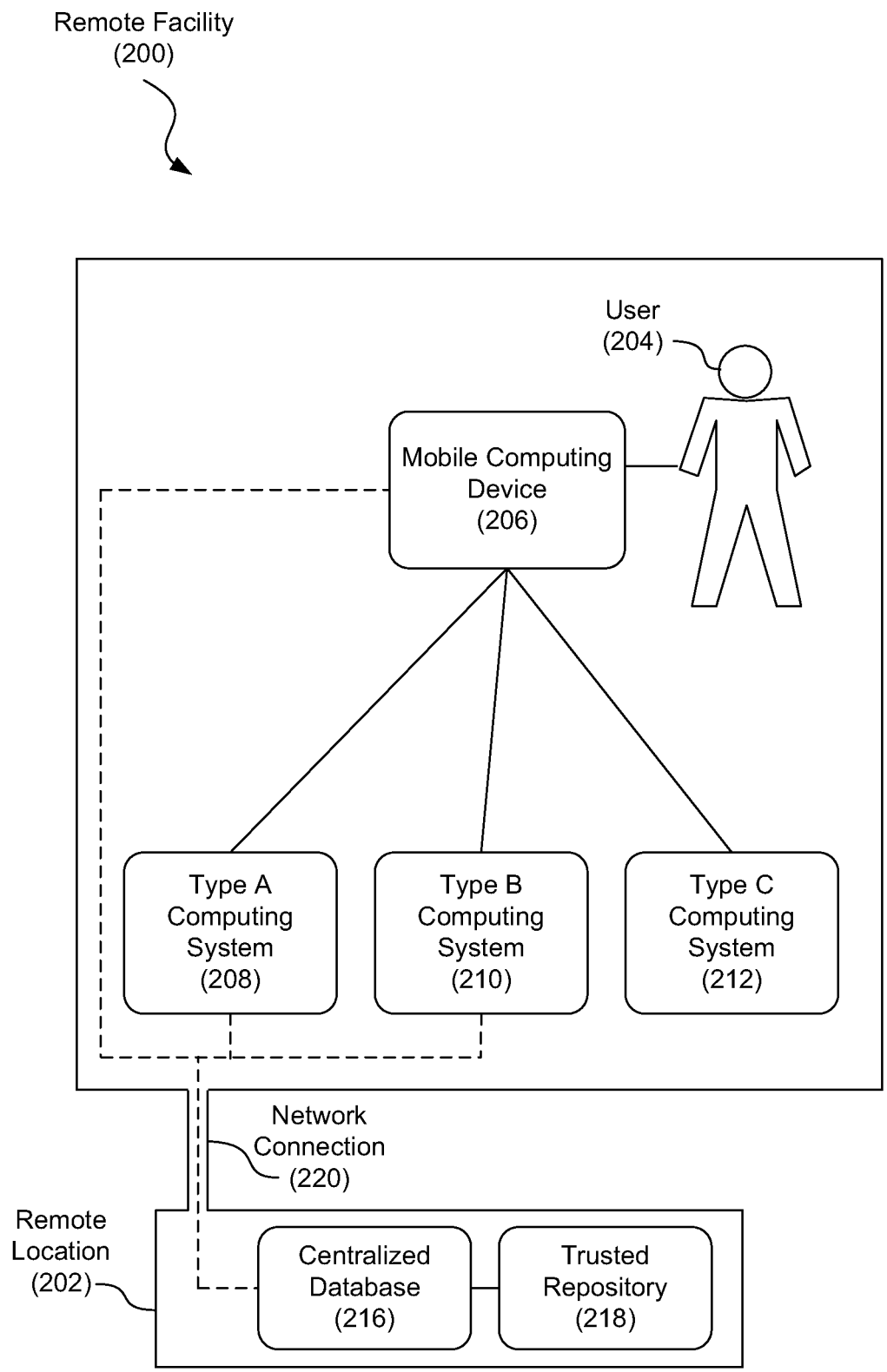
FIG. 2 is a diagram showing an illustrative remote system, according to one example of principles described herein.

FIG. 2 is a diagram showing an illustrative remote facility (200). The remote facility (200) is also connected to a remote location (202) via a network connection (220). The remote location may include a centralized database (216) that is associated with a trusted repository (218). The remote location (202) may be, for example, an operating center for an entity that operates the remote facility (200). Within the remote facility (200), various types of computing systems may be used to operate or monitor various pieces of equipment. For purposes of illustration, the characteristics of computing systems within a remote facility will be placed into three general categories.

The first type of computing system will be referred to as a type A computing system. A type A system is one that maintains its own repository of users and access data for those users. A type A computing system may also be connected to a remote location and have its repository of users accessed from the remote location. Thus, the entity which operates the remote facility may make changes to the type A computing system's repository of users as is needed. Because the type A system maintains its own repository of users and assigned unique access data to those users, it is able to maintain an accurate, accountable log of who accesses this type of computing system. In addition, new users can be added, deleted or modified from the remote location (202). Thus, if a contractor who is currently not authorized to access a type A computing system (208), and now needs access, then the contracting entity may add that user from a remote location (202). Additionally, the contracting entity may provide the contractor with his or her newly created access data for that type A computing system.

The second type of computing system will be referred to as a type B computing system (210). A type B computing system (210) does not maintain a repository of users. Rather, a single set of access data that is not tied to a particular user may be used to access the type B computing system (210). Furthermore, the access criteria such as a username and password that will grant access to the type B system (210) can be changed from a remote location (202). When a contractor needs to access a type B computing system (210), he or she may be provided with the username and password for that system. However, upon completion of the assignment, the username and password for the type B computing system (210) can be changed from a remote location. Thus, the security of the type B computing system (210) is maintained.

The third type of computing system will be referred to as a type C computing system (212). Unlike both type A computing systems (208) and type B computing systems (210), a type C computing system (212) is not able to have its access criteria changed from a remote location. This may be because a type C computing system is not connected to an external network. Alternatively, a type C computing system (212) may be connected to an external network. However, the settings of the type C computing system (212) may be such that access criteria can only be changed from a local console. To provide contractors with the access data to a type C computing system (212) brings up security risks and results in a violation of various security standards. This is because a contractor, rather than an employee is now given permanent access to a secure system beyond the duration of his or her need for use of access. Access cannot be revoked upon completion of the contractor's job because the access criteria cannot be changed remotely.

A contractor is granted access to a type C computing system through use of the remote secure access application installed on his or her mobile computing system. Specifically, through use of the remote secure access application, the contractor can check out the access data for the type C computing system. This access data is not actually shown to the user. Rather, the mobile computing system interfaces with the type C computing system and provides the user with access to the type C computing system. Thus, the contractor is never provided with a username and password or other access data for the type C computing system. Upon completing the job, the contractor will then check back in the access data to the centralized database. Thus, the only way to again gain access would require authorization from the contracting entity.

Figure 3:
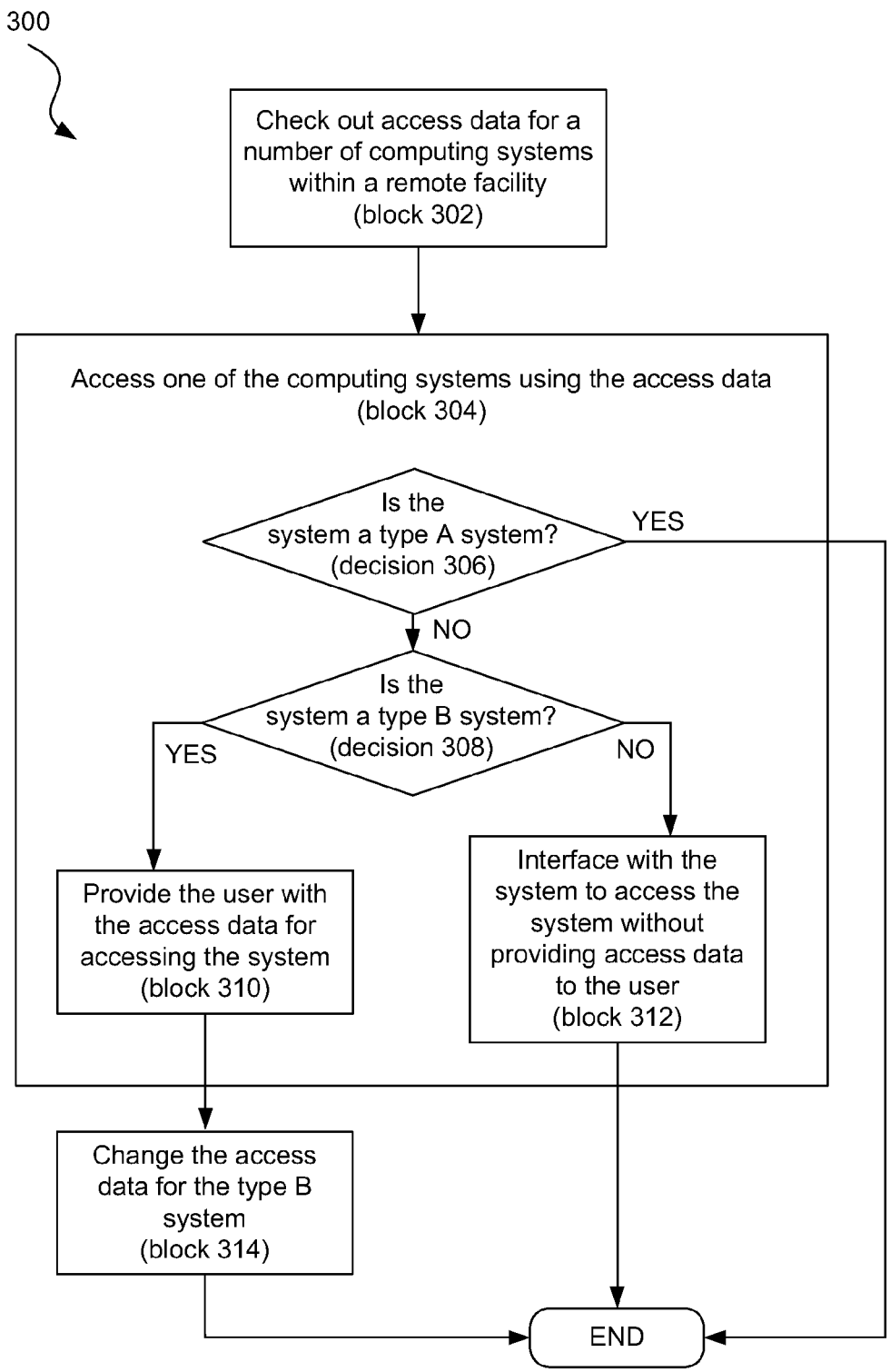
FIG. 3 is a flowchart showing an illustrative process for accessing computing systems within a remote facility, according to one example of principles described herein.

FIG. 3 is a flowchart showing an illustrative process (300) for accessing computing systems within a remote facility. In one example, a contractor is assigned to do some maintenance work on a remote facility for an entity operating that remote facility. The contracting entity may provide the contractor with a mobile computing system such as a laptop computer or a personal digital assistant (PDA) that is capable of interfacing with the computing systems of the remote facility. Alternatively, the contracting entity may provide the contractor with a computer application which the contractor may install on his or her own mobile computing system. This application, whether installed on a computing system owned by the contracting entity or installed on the contractor's computing system, is referred to as the remote secure access application.

According to certain illustrative examples, the contractor accesses and enters the remote facility. In some cases, the contractor may be provided with a key or keycard that will provide the contractor with access to the remote facility. The contractor may use his or her mobile computing system to connect to an external network which will allow the remote secure access application running on the contractor's mobile computing system to interface with the contract entity's centralized database. The contractor can then check out (302) access data for a number of computing systems within the remote facility. It may be the case that the contractor only receives access data for a subset of the total number of computing systems within the facility. For example, if the contractor is only being hired to do maintenance on a subset of computing systems, he or she may be given access to only those computing systems.

Using the checked out access data, the contractor may access (block 304) one of the computing systems within the remote facility. The manner in which a computing system is accessed will depend on the type of that computing system. Thus, it is first determined (decision 306) whether or not the computing system to be accessed is a type A computing system. If the computing system being accessed is indeed (decision 306, YES) a type A computing system, then accessing the computing system consists of having the contractor enter in a username and password that is unique to that contractor. If the contractor does not already have this access data, he or she may request it from the contracting entity over the network. The access data may be pre-provisioned to a remote repository so that when the employee or contractor uses the computing system, using his or her unique access data, his or her access is logged and thus traceable. The provided access data may be displayed to the contractor so that he or she can enter it into the type A computing system which he or she is attempting to access.

If it is determined that the computing system to be accessed is not (decision 306, NO) a type A computing system, then it is determined (decision 308) whether the computing system is a type B computing system. If the computing system to be accessed is indeed (decision 308, YES) a type B computing system, then the contractor may be provided (block 310) with the access data for that computing system. In one example, the remote secure access application displays to the contractor, the username and password for accessing the type B computing system. In some cases, the remote secure access application may not display the access data. Rather, the remote secure access application will log the user into the type B computing system directly. When the contractor logs out after completing his or her job, the contracting entity may change (block 314) the access data for that type B computing system. Thus, the contractor will not be able to again access the type B computing system without first getting approval, and renewed access data, from the contracting entity.

If it is determined that the computing system to be access is not (decision 308, NO) a type B computing system, then it must be a type C computing system. As such, the mobile computing system will interface (block 312) with the computing system to be accessed and access that computing system for the contractor without ever providing the access information to the user. In one example, the access data for the type C computing system may be obtained on demand from a credential vault system within the security application managed by the contracting entity.

In one example, the contractor's mobile computing system interfaces with the type C computing system over a direct hardwired connection. Specifically, the contractor may connect a network cable between the mobile computing system and the type C computing system. Alternatively, the type C computing system may be connected to network that is internal to the remote facility. In this case, the user may interface with the type C computing system through this internal network.

In some cases, the remote secure access application may include a single sign-on feature where the user enters in his or her username and password on the mobile computing system. The mobile computing system, which is interfaced with all computing systems within the remote facility on which the user is authorized to work, can then access each of those computing systems within the remote facility for the user. Thus, the user does not have to know or enter in access data for each computing system separately. In some cases, the single sign-on feature may not access each computing system within the remote computing system as some computing systems may be incompatible with the single sign-on feature.

Figure 4:
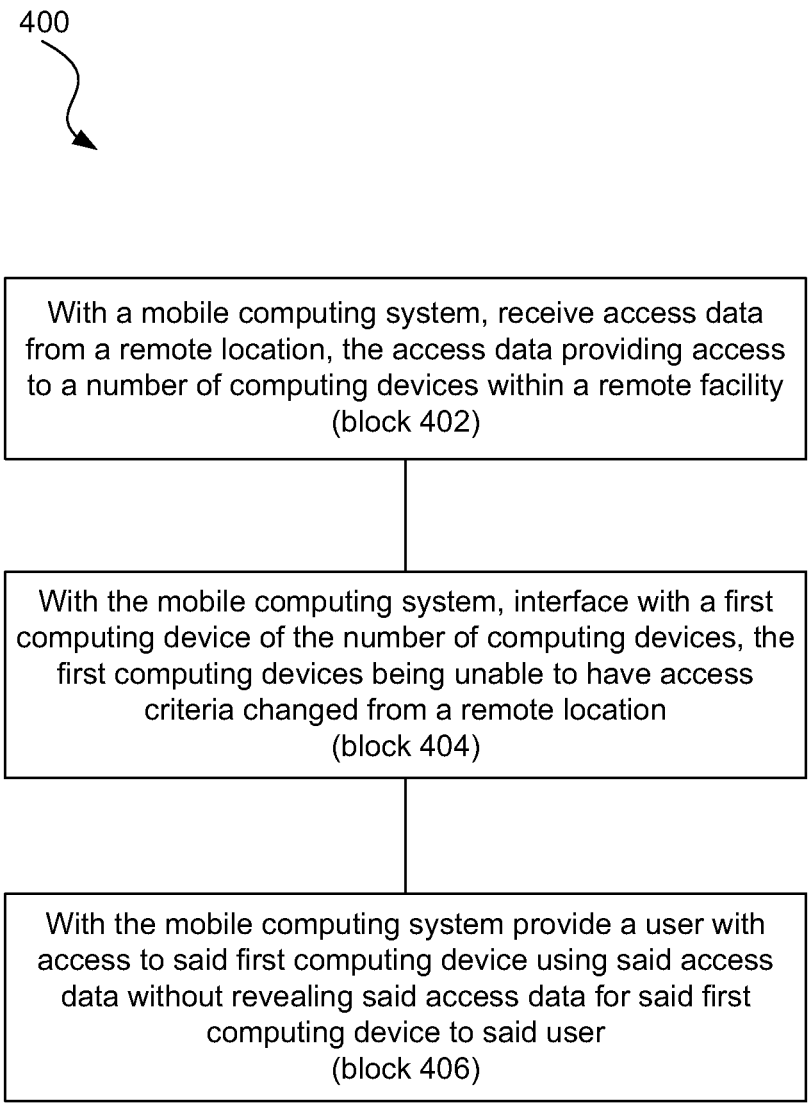
FIG. 4 is a flowchart showing an illustrative method for securely accessing a remote system, according to one example of principles described herein.

FIG. 4 is a flowchart showing an illustrative method (400) for securely accessing a remote system. According to certain illustrative examples the method includes, with a mobile computing system, receiving (block 402) access data from a remote location, the access data providing access to a number of computing systems within a remote facility. The method further includes, with the mobile computing system, interfacing (block 404) with a first computing system of the number of computing systems, the first computing systems being unable to have access criteria changed from a remote location, and with the mobile computing system, providing (block 406) a user with access to the first computing system using the access data without revealing the access data for the first computing system to the user.

In sum, through use of methods and systems embodying principles described herein, users may be provided access to computing systems within a remote facility without compromising defined security standards. Such users are provided access to computing systems with access criteria that is unable to be changed from a remote location. This access is provided without the user ever being aware of the access data used to access those computing systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securely accessing a number of computing systems within a remote facility, the method comprising:
   with a mobile computing system, checking out access data from a centralized database, said access data providing access to said number of computing systems within said remote facility;
   with said mobile computing system, interfacing with a first computing system of said number of computing systems, said first computing system being unable to have access criteria changed from a remote location; and
   with said mobile computing system providing a user with access to said first computing system using said checked out access data without revealing said checked out access data to said user.

2. The method of claim 1, further comprising, with said mobile computing system, providing said user of said mobile computing system with said checked out access data to a second computing system of said number of computing systems, said second computing system being capable of having access criteria changed remotely.

3. The method of claim 2, wherein access criteria of said second computing system is automatically changed upon said user logging off of said second computing system.

4. The method of claim 2, wherein said second computing system does not maintain a database of users.

5. The method of claim 1, wherein said access data comprises a single sign-on feature to access said number of computing systems within said remote facility.

6. The method of claim 1, wherein said user is only provided access to a subset of said computing systems within said remote facility, said subset based on permissions associated with said user.

7. The method of claim 1, wherein said remote facility comprises a utility substation.

8. The method of claim 1, wherein said access data comprises a user identification and password.

9. A mobile computing system comprising:
   a processor; and
   a memory communicatively coupled to said processor;
   in which said processor is configured to:
      check out access data from a centralized database, said access data providing access to a number of computing systems within a remote facility;
      interface with a first computing system of said number of computing systems, said first computing systems being unable to have access criteria changed from a remote location; and
      provide a user with access to said first computing system using said checked out access data without revealing said access data to said user.

10. The system of claim 9, wherein said processor is further configured to provide said user of said mobile computing system with access data to a second computing system of said number of computing systems, said second computing system being capable of having access criteria changed remotely.

11. The system of claim 10, wherein access criteria of said second computing system is automatically changed upon said user logging off of said second computing system.

12. The system of claim 10, wherein said second computing system does not maintain a database of users.

13. The system of claim 9, wherein said access data comprises a single sign-on feature to access said number of computing systems within said remote facility.

14. The system of claim 9, wherein said user is only provided access to a subset of said computing systems within said remote facility, said subset based on permissions associated with said user.

15. The system of claim 9, wherein said remote facility comprises a utility substation.

16. The system of claim 9, wherein said access data comprises a user identification and password.

17. A computer program product for allowing secure access to a remote facility, said computer program product comprising:
   a computer readable storage medium having computer readable code embodied therewith, said computer readable program code comprising:
      computer readable program code configured to check out access data from a remote location, said access data providing access to a number of computing systems within a remote facility;
      computer readable program code configured to interface with a first computing system of said number of computing systems, said first computing systems being unable to have access criteria changed from a remote location; and
      computer readable program code configured to provide a user with access to said first computing system using said checked out access data without revealing said access data to said user.

18. The computer program product of claim 17, wherein said processor is further configured to provide said user of said mobile computing system with access data to a second computing system of said number of computing systems, said second computing system being capable of having access criteria changed remotely.

19. The computer program product of claim 18, wherein access criteria of said second computing system is automatically changed upon said user logging off of said second computing system.

20. The computer program product of claim 18, wherein said second computing system does not maintain a database of users.

21. The computer program product of claim 17, wherein said access data comprises a single sign-on feature to access said number of computing systems within said remote facility.

22. The computer program product of claim 17, wherein said user is only provided access to a subset of said computing systems within said remote facility, said subset based on permissions associated with said user.

23. The computer program product of claim 17, wherein said remote facility comprises a utility substation.

24. The computer program product of claim 17, wherein said access data comprises a user identification and password.

25. A method for securely accessing remote systems, the method comprising:

with a mobile computing system, checking out access data from a remote location, said access data providing access to a number of computing systems within a remote facility;

with said mobile computing system, interfacing with one of said computing systems;

with said mobile computing system, providing access for a user to said one of said computing systems using said checked out access data without revealing said checked out access data to said user if said one of said computing systems is unable to have access criteria changed from a remote location; and with said mobile computing system, providing said user with said checked out access data to said one of said computing systems if said one of said computing systems can have its access criteria changed from a remote location.

\* \* \* \* \*